Patented June 12, 1951

2,556,545

UNITED STATES PATENT OFFICE 2,556,545

PRODUCTION OF METHINE DYESTUFFS

John David Kendall and George Frank Duffin, Ilford, England, assignors to Ilford Limited, Ilford, England, a British company No Drawing. Application June 3, 1948, Serial No. 30,974. In Great Britain June 11, 1947

7 Claims. (Cl. 260—240.4)

This invention relates to the production of methine dyestuffs.

In British Patent No. 585,089 a process is described for the production of oxazolone derivatives of the general Formula I:

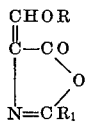

(I)

In this formula R may represent an alkyl or aralkyl group, such as ethyl, propyl or benzyl, and $R_1$ may represent a saturated or unsaturated, substituted or unsubstituted hydrocarbon group, for example an alkyl, aralkyl or aryl group, e. g. butenyl, amyl, phenyl, styryl, p-nitrophenyl and p-nitrostyryl.

In United States application Ser. No. 30,973, filed June 3, 1948 (now abandoned), there are described "oxazolone derivatives of the general Formula II:

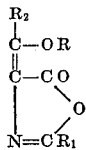

(II)

and their preparation by reacting in the presence of an acid anhydride, e. g. acetic anhydride, an ortho ester of the formula $R_2C(OR)_3$ where R and $R_2$ are alkyl groups and an N-acyl glycine of the formula $R_1CO.NH.CH_2COOH$ where $R_1$ is an aryl group. Thus, for example, R and $R_2$ may be methyl, ethyl or higher alkyl, and $R_1$ may be phenyl.

In this formula R and $R_2$ are alkyl groups and $R_1$ is an aryl group, for example R and $R_2$ may be methyl, ethyl or higher alkyl, and $R_1$ may be phenyl.

According to the present invention methine dyestuffs are produced by reacting together compounds of the general Formula I or II above with a heterocyclic nitrogen compound containing a reactive methylene group. The methylene group may be cyclic or acyclic, and suitable compounds are as follows:

(a) Compounds of the general Formula III:

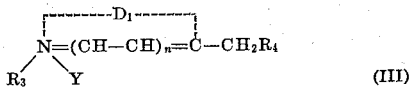

(III)

where $D_1$ is the residue of a five-membered or six-membered heterocyclic nitrogen compound, $R_3$ is an alkyl, hydroxyalkyl, aralkyl or hydroxyaralkyl group, $R_4$ is a hydrogen atom or a hydrocarbon group, Y is an acid radicle and $n$ is nought or one.

(b) Compounds of the general Formula IV:

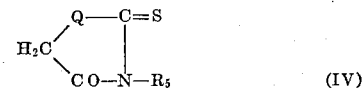

(IV)

where Q is an oxygen atom or a sulphur atom and $R_5$ is hydrogen or a hydrocarbon group.

The products obtained by the use of compounds of type (a) have the general Formula V:

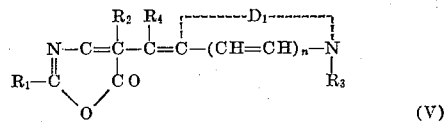

(V)

while those produced by the use of compounds of type (b) have the general Formula VI:

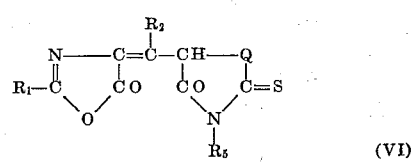

(VI)

Compounds of type (a) which may be employed may be any of those which have been used or proposed for use in the many processes for the production of cyanine and similar dyestuffs, for example, thiazoloes, thiazoles, oxazoles, selenazoles and their polycyclic homologues such as those of the benzene, naphthalene, acenaphthene and anthracene series; pyridine and its polycyclic homologues such as quinoline and α and β naphthaquinolines; lepidines; indolenines; diazines, such as pyrimidines and quinazolines; diazoles (e. g. thio-ββ'-diazole); oxazolines, thiazolines and selenazolines. The polycyclic compounds of these series may also be substituted in the carbocyclic rings with one or more groups such as alkyl, aryl, amino, hydroxy, alkoxy and methylene-dioxy groups, or by halogen atoms.

Compounds of type (b) which may be employed are rhodanic acid and oxarhodanic acid and the N-hydrocarbon substitution derivatives of these compounds.

The reaction may be effected by heating the reagents together, conveniently in the presence of a solvent and in some cases desirably also in the presence of a base, e. g. pyridine, piperidine or triethylamine.

The following examples serve to illustrate the invention:

EXAMPLE 1

*Preparation of 3-ethyl dihydrobenzthiazolylidene - 2 - [4'-ethylidene - 2' - phenyl - 5' - oxazolone]*

1.49 gms. of 2-methyl benzthiazole were fused with 1.90 gms. of ethyl p-toluene sulphonate on an oil bath for 3 hours at 150° C. and then 2.17 gms. of 4-ethoxy methylene-2-phenyl-5-oxazolone and 10 cc. of pure pyridine were added and the mixture refluxed for 1 hour. The mixture was then poured into water whereupon the dye crystallised out. On recrystallisation from methyl alcohol it was obtained as crystals melting at 194° C.

EXAMPLE 2

*Preparation of 3-ethyl dihydrobenzthiazolylidene - 2[4' - isopropylidene - 2' - phenyl - 5' - oxazolone]*

1.49 gms. of 2-methyl benzthiazole and 1.90 gms. of ethyl p-toluene sulphonate were fused in an oil bath for 3 hours at 150° C. and mixed with 2.31 gms. of 4-ethoxy ethylidene-2-phenyl-5-oxazolone and 10 cc. of pyridine, and boiled for 1 hour. The dye was isolated by pouring the mixture into water and was recrystallised from ethyl alcohol. Melting point 231° C.

The 4-ethoxy ethylidene-2-phenyl-5-oxazolone referred to above can be prepared, as described in aforesaid application Ser. No. 30,973, by reacting 24 grams of hippuric acid, 27 cc. of acetic anhydride and 22 cc. of ethyl ortho acetate which were heated on an oil bath at 150° C. for two hours. The reaction mixture was then heated under reduced pressure, and finally in an oil bath at 135° C. and 2 mm. pressure. The product was then recrystallised from ethyl alcohol and found to have a melting point of 113° C.

EXAMPLE 3

*Preparation of 3-ethyl dihydrobenzthiazolylidene - 2[4' - isobutylidene - 2' - phenyl - 5' - oxazolone]*

1.49 gms. of 2-methyl benzthiazole and 1.90 gms. of ethyl p-toluene sulphonate were fused in an oil bath for 3 hours at 150° C. and mixed with 2.43 gms. of 4-ethoxy propylidene-2-phenyl-5-oxazolone and 10 cc. of pyridine, and boiled for 1 hour. The dye was isolated by pouring the mixture into water and was recrystallised from ethyl alcohol. Melting point 197° C.

The 4-ethoxy propylidene-2-phenyl-5-oxazolone referred to above can be prepared, as described in aforesaid application Ser. No. 39,973, by reacting 17.9 grams of hippuric acid, 19.5 cc. of ethyl ortho propionate and 20 cc. of acetic anhydride which were boiled for two hours and then heated under reduced pressure in an oil bath at 135° C. the pressure being reduced to 2 mm. A little ethyl alcohol was then added, whereupon the product crystallised, and on recrystallisation from ethyl alcohol was obtained as crystals melting at 59° C.

EXAMPLE 4

*Preparation of 1.3.3-trimethyl indolylidene-2[4'-ethylidene-2'-phenyl-5'-oxazolone]*

1.50 gms. of 2.3.3-trimethyl indolenine methiodide and 1.09 gms. of 4-ethoxy methylene-2-phenyl-5-oxazolone were boiled in 10 cc. of pyridine for 30 minutes and the mixture then poured into water. The product separated and was recrystallised from ethyl alcohol. Melting point 186° C.

EXAMPLE 5

*Preparation of 1 - ethyl - 1:2 - dihydro-quinolylidene-2[4'-ethylidene-2'-phenyl-5'-oxazolone]*

1.50 gms. of quinaldine ethiodide and 1.09 gms. of 4-ethoxy methylene - 2 - phenyl - 5 - oxazolone were boiled in pyridine for 30 minutes and the mixture poured into water. The product separated and was recrystallised from methyl alcohol. Melting point 217° C.

EXAMPLE 6

*Preparation of 1 - ethyl - 1:2 - dihydro - quinolylidene - 2[4' - isopropylidene-2'-phenyl-5'-oxazolone]*

3.00 parts of quinaldine ethiodide and 2.31 parts of 4-ethoxy ethylidene - 2 - phenyl - 5 - oxazolone were boiled in 40 parts of ethanol to which was added 1.4 parts of triethylamine for 2 hours, and the mixture poured into water. The product separated and was recrystallised from methyl alcohol. Melting point 197° C.

EXAMPLE 7

*Preparation of 1 - ethyl - 1:4 - dihydro-quinolylidene-4[4'-ethylidene-2'-phenyl-5'-oxazolone]*

0.72 part of lepidine was fused with 1.00 part of ethyl p-toluene sulphonate at 140° C. for 2 hours. The resulting material was dissolved in 20 cc. of ethanol and 1.08 parts of 4-ethoxy-methylene-2-phenyl-5-oxazolone and 0.7 part of triethylamine were added. The mixture was boiled for 1 hour, poured into water and the precipitated product filtered and recrystallised from methyl alcohol. Melting point 207° C.

The corresponding dye in which the 1-ethyl group is replaced by a 1-methyl group is obtainable by a similar method, melting point 260° C.

EXAMPLE 8

*Preparation of 3 - ethyl - dihydrobenzselenazolylidene-2[4'-ethylidene-2'-phenyl-5'-oxazolone]*

0.98 part of 2-methyl benzselenazole was fused with 1.00 part of ethyl p-toluene sulphonate for 3 hours at 140° C. The product was dissolved in 20 cc. of ethanol and 1.08 parts of 4-ethoxy-methylene-2-phenyl-5-oxazolone and 0.7 part of triethylamine were added. The mixture was boiled for 2 hours, poured into water and the precipitated dye filtered and recrystallised from methyl alcohol. Melting point 199° C.

EXAMPLE 9

*Preparation of 3.4 - dimethyl - dihydrothiazolylidene-2[4'-ethylidene-2'-phenyl-5'-oxazolone]*

1.345 parts of 2:4-dimethyl-thiazole methiodide and 1.08 parts of 4-ethoxy methylene-2-phenyl-5-oxazolone were boiled for 1 hour in 20 parts of ethanol and 0.7 part of triethylamine. The dye was precipitated by pouring into water and was recrystallised from methyl alcohol. Melting point 266° C.

EXAMPLE 10

*Preparation of 3 - ethyl - dihydrobenzoxazolylidene-2[4'-ethylidene-2'-phenyl-5'-oxazolone]*

1.45 parts of 2-methyl benzoxazole ethiodide and 1.08 parts of 4-ethoxy-methylene-2-phenyl-5-oxazolone were boiled for 2 hours in 20 parts of ethanol and 0.7 part of triethylamine. The dye was precipitated by pouring into water and was recrystallised from methanol. Melting point 229° C.

EXAMPLE 11

*Preparation of 3 - methyl - tetrahydrothiazolylidene-2[4'-ethylidene-2'-phenyl-5'-oxazolone]*

0.94 part of 2-methyl thiazoline was fused with 1.78 parts of methyl p-toluene sulphonate at 140° C. for 1 hour. The product was dissolved in 20 parts of ethanol and 2.02 parts of 4-ethoxymethylene-2-phenyl-5-oxazolone and 1.4 parts of triethylamine were added. The mixture was boiled for 1 hour and the dye precipitated by pouring into water and recrystallised from methyl alcohol. Melting point 209° C.

EXAMPLE 12

*Preparation of 3 - methyl - tetrahydrothiazolylidene-2[4'-isopropylidene - 2' - phenyl-5'-oxazolone]*

0.93 part of 2-methyl thiazoline was fused with 1.76 parts of methyl p-toluene sulphonate for 1 hour at 140° C. The product was dissolved in 20 parts of ethanol and 2.12 parts of 4-ethoxy-ethylidene-2-phenyl-5-oxazolone and 1.4 parts of triethylamine were added. The mixture was boiled for 3 hours and the dye precipitated by pouring into water and recrystallised from methyl alcohol. Melting point 214° C.

EXAMPLE 13

*Preparation of 4-keto-2-thio-tetrahydrothiazole-5[4'-methylene-2'-phenyl-5'-oxazolone]*

1.47 parts of N-ethyl rhodanic acid and 2.17 parts of 4-ethoxy-methylene-2-phenyl-5-oxazolone were dissolved in 20 parts of ethanol and 1.4 parts of triethylamine added. The solution was boiled for 2 hours, diluted with water and the precipitated dye filtered and recrystallised from methanol. Melting point 169° C.

EXAMPLE 14

*Preparation of 3-ethyl-2:3-dihydrobenzoxazolylidene-2[4'-propylidene-2'-phenyl-5'-oxazolone]*

1.10 parts of 4-ethoxy-ethenyl-2-phenyl-5-oxazolone and 1.38 parts of 2-methyl benzoxazole ethiodide were dissolved in 10 parts of pure pyridine and 1 part of triethylamine and the solution boiled for 2 hours. The dye was precipitated by diluting with water and recrystallised from methanol. Melting point 212° C.

EXAMPLE 15

*Preparation of 3-ethyl-2:3-dihydrobenzoxazolylidene - 2[4'-isobutylidene-2'-phenyl-5'-oxazolone]*

1.45 parts of 2-methyl benzoxazole ethiodide and 1.22 parts of 4-ethoxy-propylidene-2-phenyl-5-oxazolone were dissolved in 10 parts of pure pyridine and 1 part of triethylamine. The solution was boiled for 3 hours and the dye precipitated by pouring into water and recrystallised from methyl alcohol. Melting point 164° C.

EXAMPLE 16

*Preparation of 3 - methyl-tetrahydrothiazolylidene - 2 [ 4' - isobutylidene - 2' - phenyl - 5' - oxazolone]*

0.89 part of 2-methyl thiazoline and 1.65 parts of methyl p-toluene sulphonate were fused at 150° C. for 1 hour. The product was dissolved in 20 parts of ethanol and 2.16 parts of 4-ethoxy-propylidene-2-phenyl-5-oxazolone and 1.4 parts of triethylamine added. The solution was boiled for 4 hours, the dye then precipitated by diluting with water and recrystallised from methyl alcohol. Melting point 192° C.

EXAMPLE 17

*Preparation of 1 - methyl-1:4-dihydroquinolylidene-4[4'-propylidene -2'- phenyl-5'-oxazolone]*

0.72 part of lepidine and 1.00 part of ethyl p-toluene sulphonate were fused at 140° C. for 3 hours. The product was dissolved in 20 ccs. of alcohol and 1.15 parts of 4-ethoxy-ethenyl-2-phenyl-5-oxazolone and 1 part of triethylamine were added. The mixture was boiled for 2 hours, and the dye then filtered off and recrystallised from methyl alcohol. Melting point 215° C.

EXAMPLE 18

*Preparation of 1-ethyl-1:2-dihydroquinolylidene-2[4'-isobutylidene-2'-phenyl-5'-oxazolone]*

1.50 parts of quinaldine ethiodide and 1.22 parts of 4-ethoxy-propylidene-2-phenyl-5-oxazolone were dissolved in 20 parts of ethanol and 1 part of triethylamine. The solution was boiled for 2 hours and the dye precipitated by diluting with water and recrystallised from methyl alcohol. Melting point 250° C.

The dyestuffs of this invention are valuable photographic sensitising dyes. Thus, for example, the product of Example 1, incorporated in a gelatino silver iodobromide emulsion, imparts a maximum at 5700 Å., and the product of Example 5, similarly employed, imparts a band of sensitivity extending to 6900 Å., with a maximum at 6100 Å. The product of Example 7, similarly employed, extends the sensitivity to about 7200 Å. with a gap at about 5000–5200 Å., and the corresponding 1-methyl dye has a similar sensitising action. The product of Example 8 is a particularly powerful dye, extend to 6400 Å. with a maximum at 6700 Å. The product of Example 9 extends to 6200 Å. with an indeterminate maximum circa 5500 Å.

The dyes may be incorporated in any silver chloride, bromide, iodobromide and chlorobromide emulsions in sensitising amounts, and the invention is to be understood to include photographic silver halide emulsions sensitised by the inclusion of such dyes.

What we claim is:

1. Process for the production of methine dyestuffs which comprises reacting a compound of the general formula:

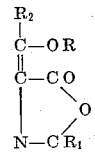

where R is an alkyl group, $R_1$ is an aryl group and $R_2$ is selected from hydrogen and alkyl groups, with a heterocyclic nitrogen compound containing a reactive methylene group.

2. Process for the production of methine dyestuffs which comprises reacting a compound of the general formula:

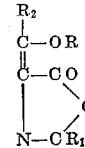

where R is an alkyl group, $R_1$ is an aryl group and $R_2$ is selected from hydrogen and alkyl groups, with a compound of the general formula:

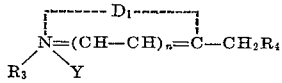

where $D_1$ is a residue selected from the class consisting of the residue of five-membered and six-membered heterocyclic nitrogen nuclei, $R_3$ is selected from the class consisting of alkyl, aralkyl, hydroxyalkyl and hydroxyaralkyl groups, $R_4$ is selected from the class consisting of the hydrogen atom and hydrocarbon groups, $n$ is nought or one, and Y is an acid radicle.

3. Process for the production of methine dyestuffs which comprises reacting a compound of the general formula:

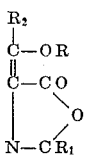

where R is an alkyl group, $R_1$ is an aryl group and $R_2$ is selected from hydrogen and alkyl groups, with a compound of the general formula:

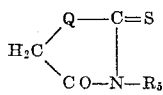

where Q is an atom selected from the class consisting of oxygen and sulphur atoms and $R_5$ is selected from the class consisting of the hydrogen atom and hydrocarbon groups.

4. Process for the production of methine dyestuffs which comprises reacting a compound of the general formula:

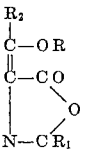

where R is an alkyl group, $R_1$ is an aryl group and $R_2$ is selected from hydrogen and alkyl groups, with a compound of the general formula:

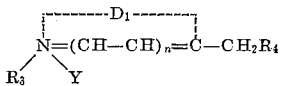

where $D_1$ is a residue selected from the class consisting of the residue of five-membered and six-membered heterocyclic nitrogen nuclei, $R_3$ is selected from the class consisting of alkyl, aralkyl, hydroxyalkyl and hydroxyaralkyl groups, $R_4$ is selected from the class consisting of the hydrogen atom and hydrocarbon groups, $n$ is nought or one, and Y is an acid radicle, the said reaction being effected in the presence of a solvent for the reactants and a basic substance.

5. Process for the production of methine dysstuffs which comprises reacting a compound of the general formula:

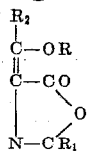

where R is an alkyl group, $R_1$ is an aryl group and $R_2$ is selected from hydrogen and alkyl groups, with a compound of the general formula:

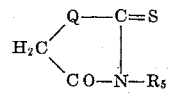

where Q is an atom selected from the class consisting of oxygen and sulphur atoms and $R_5$ is selected from the class consisting of the hydrogen atom and hydrocarbon groups, the said reaction being effected in the presence of a solvent for the reactants and a basic substance.

6. A dyestuff of the general formula:

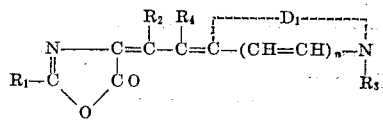

where $R_1$ is an aryl group, $R_2$ is an alkyl group, $R_3$ is selected from the class consisting of alkyl, hydroxyalkyl, aralkyl and hydroxyaralkyl groups, $R_4$ is selected from the class consisting of the hydrogen atom and hydrocarbon groups, $D_1$ is a residue selected from the class consisting of the residues of five-membered and six-membered heterocyclic nitrogen nuclei and $n$ is selected from nought and one.

7. The dyestuff 3-ethyl-dihydrobenzselenazolylidene-2 4'-ethylidene - 2' - phenyl-5'-oxazolone having the formula:

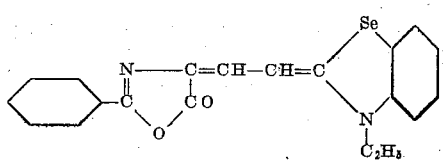

JOHN DAVID KENDALL.
GEORGE FRANK DUFFIN.

REFERENCES CITED

The following references are of record in the file of this patent:

UNITED STATES PATENTS

| Number | Name | Date |
| --- | --- | --- |
| 2,166,736 | White et al. | July 18, 1939 |
| 2,185,343 | Keyes | Jan. 2, 1940 |
| 2,226,158 | Davey | Dec. 24, 1940 |
| 2,263,749 | White et al. | Nov. 25, 1941 |
| 2,263,757 | Brooker | Nov. 25, 1941 |
| 2,322,015 | Hamer et al. | June 15, 1943 |
| 2,340,882 | Kendall | Feb. 8, 1944 |
| 2,342,546 | Kendall | Feb. 22, 1944 |
| 2,353,164 | Kendall et al. | July 11, 1944 |
| 2,369,555 | Kendall | Feb. 13, 1945 |

OTHER REFERENCES

Chemical Abstracts 16:3101 (Abstract of Brit. Med. Journal, 1922 I, 514–515).

Chemical Abstracts 19:530 (Abstract of Proc. Roy. Soc., London, 96B, 317–333, 1924).